United States Patent [19]
Havens

[11] Patent Number: 5,909,669
[45] Date of Patent: Jun. 1, 1999

[54] SYSTEM AND METHOD FOR GENERATING A KNOWLEDGE WORKER PRODUCTIVITY ASSESSMENT

[75] Inventor: Charnell T. Havens, Collin, Tex.

[73] Assignee: Electronic Data Systems Corporation, Plano, Tex.

[21] Appl. No.: 08/625,970

[22] Filed: Apr. 1, 1996

[51] Int. Cl.[6] .................................................. G06F 17/60
[52] U.S. Cl. ................... 705/11; 705/7; 705/10
[58] Field of Search .............................. 705/1, 7, 11, 10; 707/1, 100, 104

[56] References Cited

U.S. PATENT DOCUMENTS

| | | | |
|---|---|---|---|
| 5,365,425 | 11/1994 | Torma et al. | 705/2 |
| 5,500,795 | 3/1996 | Powers et al. | 705/11 |
| 5,684,964 | 11/1997 | Powers et al. | 705/11 |
| 5,724,379 | 3/1998 | Perkins et al. | 705/2 |
| 5,809,479 | 9/1998 | Martin et al. | 705/11 |

OTHER PUBLICATIONS

Ulrich; "Profiling Organizational Competitiveness: Cultivating Capabilities"; *Human Resource Planning;* v16 n3; p1(17); Sep. 1993; Dialog: File 148, Acc#06814940.

Zamarripa; "Research Productivity: A Definition"; *Mental Retardation;* v31 n5; Oct. 1, 1993; pp. 320–325.

Zamarripa; "Evaluating Research Productivity"; *SRA Journal;* v26 n3–4; p17(11); Winter 1994; Dialog: File 148, Acc# 08414787.

Ledford; "Paying for the Skills, Knowledge, and Competencies of Knowledge Workers"; *Compensation & Benefits Review;* v27 n4; pp. 55–62; Jul./Aug. 1995; Dialog: File 15, Acc# 01079417.

*Primary Examiner*—Stephen R. Tkacs
*Attorney, Agent, or Firm*—Christopher W. Kennerly; L. Joy Griebenow

[57] ABSTRACT

A knowledge worker productivity assessment system (10) includes a database (12, 14, 16) containing survey data (15) generated using a knowledge worker productivity assessment framework (2). A benchmark database (18) contains benchmark values. A retriever (20) is coupled to the databases (12, 14, 16, 18) to retrieve selected survey data (15) and benchmark values. A calculator (38) is coupled to the retriever (20) and generates a comparison value (39) using the selected survey data (15). A relator (40) compares the comparison value (39) to a selected benchmark value to generate a knowledge worker productivity assessment.

20 Claims, 3 Drawing Sheets

FIG. 1

INFORMATION

EFFECTIVENESS

| | 50 | 54 | 58 |
|---|---|---|---|
| APPLICABILITY | 6 | 0.2 | .06 |
| UNDERSTANDABILITY | 7 | 0.4 | .12 |
| CREDIBILITY | 5 | 0.4 | .12 |
| ... | | | |
| TOTALS | 18 | 1.0 | .30 |
| | 8 | | 0.3 |

EFFICIENCY

| | 50 | 54 | 58 |
|---|---|---|---|
| LOCATABILITY | 3 | 0.7 | .14 |
| MANIPULATABILITY | 9 | 0.3 | .06 |
| ... | | | |
| TOTALS | 12 | 1.0 | .20 |
| | 9 | | 0.2 |

KNOWLEDGE WORKER

| | 52 | 56 | 59 |
|---|---|---|---|
| INFORMATION USAGE | 4 | 0.3 | .03 |
| HANDLING COMPETENCE | 6 | 0.7 | .07 |
| ... | | | |
| TOTALS | 10 | 1.0 | .10 |
| | 11 | | 0.1 |

| | 52 | 56 | 59 |
|---|---|---|---|
| HANDLING SPEED | 5 | 0.4 | .16 |
| HASSLE GENERATION | 9 | 0.6 | .24 |
| ... | | | |
| TOTALS | 14 | 1.0 | .40 |
| | 13 | | 0.4 |

SYSTEM AND METHOD FOR GENERATING A KNOWLEDGE WORKER PRODUCTIVITY ASSESSMENT

TECHNICAL FIELD OF THE INVENTION

This invention relates in general to the field of productivity analysis, and more particularly to a system and method for generating a knowledge worker productivity assessment.

BACKGROUND OF THE INVENTION

Many managers and consultants wish to assess knowledge worker productivity within an organization or other knowledge worker community. It is often desirable to assess knowledge worker productivity by comparing data associated with knowledge workers from one knowledge worker community to benchmark data associated with knowledge workers from the same or different knowledge worker communities. For example, a series of such comparisons might be performed to assess knowledge worker productivity within an organization, relative to other organizations, according to various productivity formulations.

As knowledge worker environments become larger and more complex to serve a variety of tasks and information requirements, managers and consultants may desire to assess knowledge worker productivity using various productivity assessment techniques. A known technique for assessing worker productivity measures worker output for a selected time period. Although this technique may be acceptable for worker communities for which worker output is readily susceptible to quantitative measurement, as within most manufacturing environments, such techniques may not be suitable for environments in which the primary function of workers involves obtaining, manipulating, adding value to, and acting on information.

SUMMARY OF THE INVENTION

In accordance with the present invention, the disadvantages and problems associated with knowledge worker productivity assessment systems and methods have been substantially reduced or eliminated.

In accordance with one embodiment of the present invention, a system for generating a knowledge worker productivity assessment includes a database that stores survey data and benchmark values, the survey data numerically representing a qualitative assessment concerning a criterion associated with a knowledge worker. A retriever is coupled to the database and retrieves selected survey data and benchmark values from the database. A calculator is coupled to the retriever and generates a comparison value using the selected survey data. A relator is coupled to the calculator and generates a knowledge worker productivity assessment by comparing the comparison value to a selected benchmark value.

Important technical advantages of the present invention include providing a system and method for generating a knowledge worker productivity assessment that numerically represents qualitative assessments concerning surveyed knowledge workers and selected characteristics of the information environment surrounding the surveyed knowledge workers in the form of ranks and weights. The system generates comparison values using the ranks and weights and compares the comparison values with one or more benchmark values representing surveys of the same or different surveyed knowledge workers. As a result of the comparisons, the system generates one or more knowledge worker productivity assessments concerning the surveyed knowledge workers.

Using these knowledge worker productivity assessments, managers and consultants can suggest modifications to the information environment surrounding the surveyed knowledge workers in order to increase the productivity of the surveyed knowledge workers. Knowledge worker productivity assessments may be limited to selected knowledge workers or groups of knowledge workers within an organization or knowledge worker community, or may be scalable to include knowledge workers from similar knowledge worker environments outside the organization or knowledge worker community. Other technical advantages are readily apparent to one skilled in the art from the following figures, descriptions, and claims.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
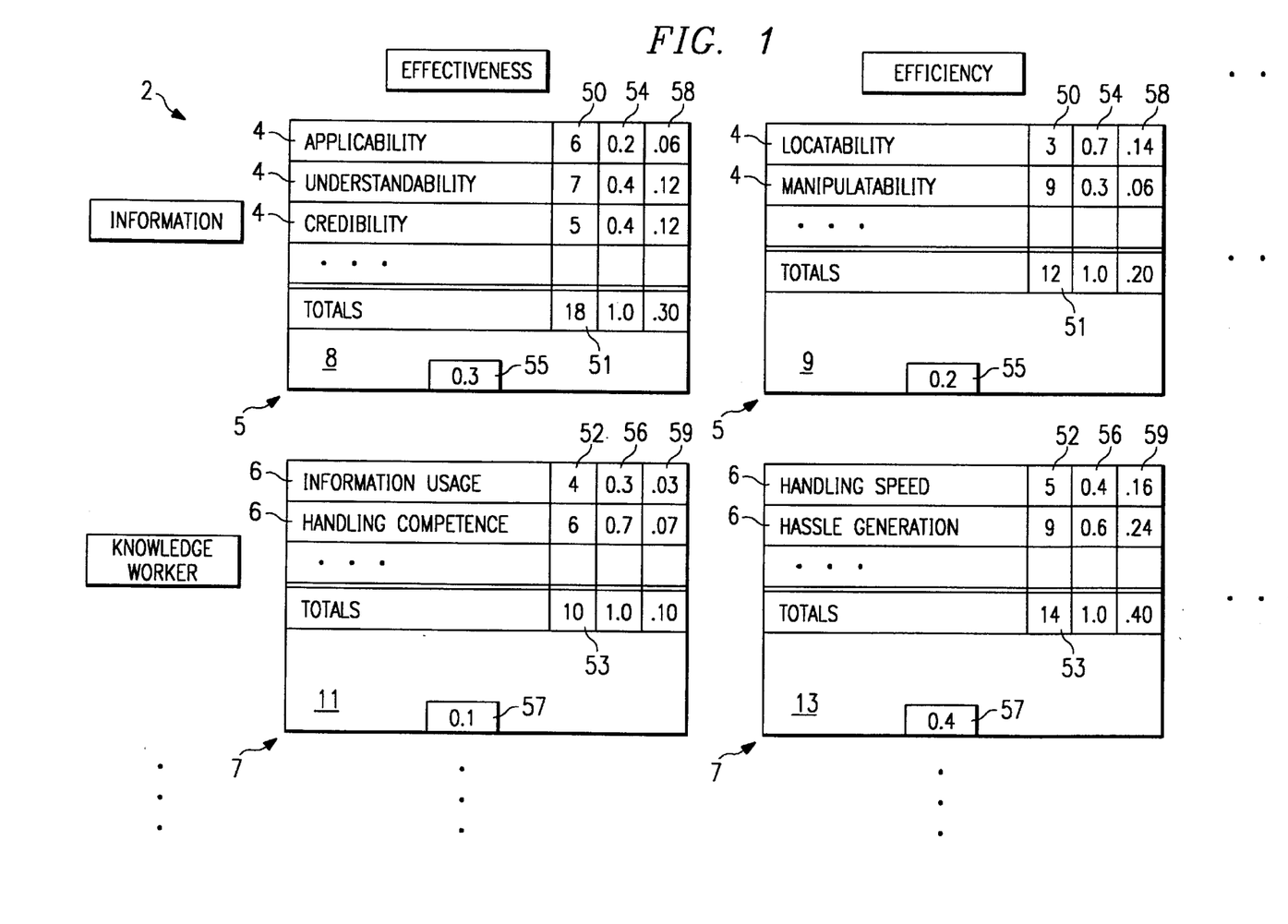
FIG. 1 illustrates a knowledge worker productivity assessment framework.

FIG. 1 illustrates a knowledge worker productivity assessment framework 2 that includes a plurality of information criteria 4 and worker criteria 6. All references to a worker, workers, worker community, or other grouping of workers include knowledge workers, which are generally any workers whose function involves obtaining, manipulating, adding value to, acting on, or any other activity concerning information. Each worker or group of workers has an associated information environment that includes the information typically available to and used by the worker or workers in performing various assigned tasks. This information has a number of associated characteristics from which information criteria 4 may be selected. Similarly, each worker or group of workers has associated capabilities typically available to the worker or workers in performing assigned tasks. These capabilities have a number of associated characteristics from which worker criteria 6 may be selected. As discussed more fully below, information criteria 4 and worker criteria 6 may be qualitatively assessed by the workers and others in order to generate survey data used in assessing the productivity of the worker or workers.

Information criteria 4 may include, without limitation: "applicability"—the extent to which available information is applicable to particular assigned tasks; "understandability"—the extent to which available information is understandable to the worker; "credibility"—the extent to which available information is accurate; "locatability"—the extent to which available information may be readily located by the worker; "manipulatability"—the extent to which available information may be manipulated by the worker; and any other characteristic of the information environment surrounding the worker or workers suitable for qualitative assessment.

Information criteria 4 may be organized into one or more information sectors 5 according to the relationships between the various information criteria 4. In one embodiment, the "applicability," "understandability," and "credibility" information criteria 4 are organized within an effectiveness information sector 8 and the "locatability" and "manipulatability" information criteria 4 are organized within an efficiency information sector 9. In general, the information criteria 4 organized within effectiveness and efficiency information sectors 8 and 9, respectively, concern the value of information available to a worker. The present invention contemplates any suitable manner of defining information criteria 4 and organizing information criteria 4 into one or more information sectors 5.

Worker criteria 6 may include, without limitation: "information usage"—the extent to which workers use and act upon available information appropriately; "handling competence"—the extent to which workers receive, manipulate, and communicate available information competently; "handling speed"—the extent to which workers receive, manipulate, and communicate available information quickly; "hassle generation"—the extent to which workers receive, manipulate, and communicate available information without generating problems for others; and any other characteristic of the capabilities of the worker or workers suitable for qualitative assessment.

Worker criteria 6 may be organized into one or more worker sectors 7 according to the relationships between the various worker criteria 6. In one embodiment, the "information usage" and "handling competence" worker criteria 6 are organized within an effectiveness worker sector 11 and the "handling speed" and "hassle generation" worker criteria 6 are organized within an efficiency worker sector 13. In general, the worker criteria 6 organized within effectiveness and efficiency worker sectors 11 and 13, respectively, concern the value added by a worker to the information available to the worker. The value of information available to a worker may be combined in some manner with the value added to the information by the worker to generate a knowledge worker productivity level suitable for measurement and analysis. The present invention contemplates any suitable manner of defining worker criteria 6 and organizing worker criteria 6 into one or more worker sectors 7.

Using one or more surveys, information criteria 4 and worker criteria 6 may be qualitatively assessed by the workers and others according to framework 2 in order to generate the survey data used in assessing the productivity of the workers. Framework 2 assigns a numeric value or rank to each information criterion 4 or worker criterion 6 each time the particular information criterion 4 or worker criterion 6 is qualitatively assessed. The resulting information criteria ranks 50 and worker criteria ranks 52, respectively, numerically represent the qualitative content of the assessments. In one embodiment, each information criteria rank 50 and worker criteria rank 52 represents a qualitative assessment concerning the perceived importance of a particular associated information criterion 4 or worker criterion 6, respectively, to the individual performing the assessment.

For example, and not by way of limitation, the "applicability" information criterion 4 might be assessed according to the following scale, the qualitative content of the assessment determining the associated information criteria rank 50: "10"—information must consistently be adequate for any assigned task; "9"—information must usually be adequate for any assigned task; "8"—information must sometimes be adequate for specific tasks; "7"—information must always be useful generally, but must seldom be adequate for specific tasks; "6"—information must often be useful generally; "5"—information must sometimes be useful generally; "4"—information must always be interesting, but need not be useful; "3"—information must frequently be interesting, but need not be useful; "2"—information need only be sporadically relevant; "1"—information need not ever be relevant.

Information criteria ranks 50 for the remaining information criteria 4 and worker criteria ranks 52 for worker criteria 6 would be similarly assigned according to the qualitative content of assessments concerning these criteria. The present invention contemplates numerically representing the qualitative content of assessments concerning information criteria 4 and worker criteria 6 in any suitable manner. Information sector rank totals 51 and worker sector rank totals 53 are equal to the sum of the information criteria ranks 50 and worker criteria ranks 52, respectively, within each information sector 5 and worker sector 7, respectively.

Information criteria ranks 50 and worker criteria ranks 52 may be generated for each information criterion 4 and worker criterion 6, respectively, for each worker or group of workers within an organization or other worker community. Information and worker criteria ranks 50 and 52, respectively, may be generated by workers, peers, managers, supervisors, or in any other suitable fashion. In one embodiment, information criteria ranks 50 are generated by individual surveyed workers and worker criteria ranks 52 are generated by peers, managers, supervisors, or other associates of the surveyed workers, referred to collectively as worker associates.

Figure 2:
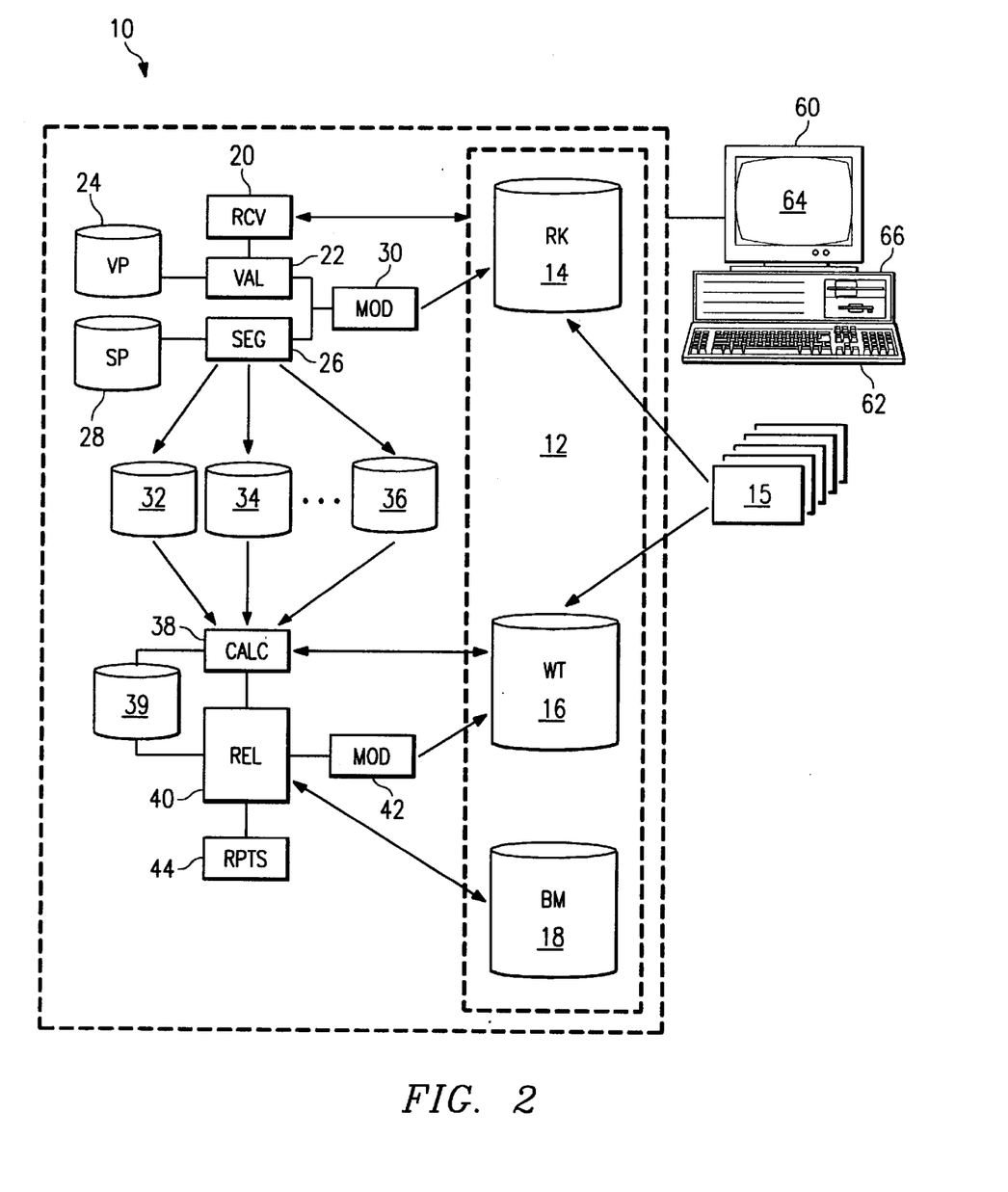
FIG. 2 illustrates a knowledge worker productivity assessment system.

For example, for a worker community that includes twenty workers, each of the twenty workers would be surveyed in order to generate information criteria ranks 50 for each information criterion 4. In addition, selected worker associates would be surveyed regarding the group of twenty workers as a whole in order to generate worker criteria ranks 50 for each worker criterion 6. Using information and worker criteria ranks 50 and 52, respectively, system 10 would then generate one or more knowledge worker productivity assessments concerning some or all of the twenty workers within the worker community.

One or more surveys may be conducted to generate information criteria ranks 50 and worker criteria ranks 52. In one embodiment, each worker within a selected group of workers is surveyed, separately or together, depending on the scope of the knowledge worker productivity assessment to be generated. Each surveyed worker qualitatively assesses information criteria 4 and, using framework 2, generates information criteria ranks 50 for each information criterion 4 according to the qualitative content of the assessments. Similarly, worker associates are selected and surveyed, separately or together, depending on the surveyed workers and the scope of the knowledge worker productivity assessment to be generated. Using framework 2, each surveyed worker associate qualitatively assesses worker criteria 6 and generates worker criteria ranks 52 for each worker criterion 6 according to the qualitative content of the assessments.

The survey data may also include a plurality of information criteria weights 54, information sector weights 55, worker criteria weights 56, and worker sector weights 57. In general, each weight 54, 55, 56, and 57 numerically represents a qualitative assessment, according to framework 2, of the relative importance of the associated information criterion 4, information sector 5, worker criterion 6, or worker sector 7. For example, the information criteria weight 54 for the "applicability" information criterion 4 might be larger or smaller than other information criteria weights 54, depending on the perceived importance of the "applicability" information criterion 4 to the individual performing the assessment. Similarly, the information sector weight 55 for the effectiveness information sector 8 might be larger or smaller than other information sector weights 55 or worker sector weights 57, depending on the perceived importance of effectiveness information sector 8 to the individual performing the assessment.

Each information criteria weight 54 and worker criteria weight 56 may be specified as a percentage or decimal value, such that the sum of the information criteria weights 54 within each information sector 5 totals 100% or 1.0 and the sum of the worker criteria weights 55 within each worker sector 7 totals 100% or 1.0. For example, with respect to effectiveness information sector 8: the "applicability" information criterion 4 might be assigned an information criteria weight 54 of "20 percent" or "0.2;" the "understandability" information criterion 4 might be assigned a weight 54 of "40 percent" or "0.4;" and the "credibility" information criterion 4 might be assigned a weight 54 of "40 percent" or "0.4."

Similarly, each information sector weight 55 and worker sector weight 57 may be specified as a percentage or decimal value, such that the sum of all information and worker sector weights 55 and 57, respectively, totals 100% or 1.0. For example: effectiveness information sector 8 might be assigned an information sector weight 55 of "30 percent" or "0.3;" efficiency information sector 9 might be assigned a weight 55 of "20 percent" or "0.2;" effectiveness worker sector 11 might be assigned a worker sector weight 57 of "10 percent" or "0.1;" and efficiency worker sector 13 might be assigned a weight 57 of "40 percent" or "0.4." One or more of the information criteria weights 54, information sector weights 55, worker criteria weights 56, or worker sector weights 57 may be assigned a zero percentage or zero value if the associated criterion or sector is perceived to have no importance to the particular individual performing the assessment.

An absolute weight 58 may be associated with each information criterion 4 according to the product of the particular associated information criteria weight 54 and the information sector weight 55. Using the "applicability" information criterion 4 as an example, if the particular associated information criteria weight 54 is "20 percent" or "0.2" and the information sector weight 55 for effectiveness information sector 8 is "30 percent" or "0.3," the absolute weight 58 would be "6 percent" or "0.06." Similarly, an absolute weight 59 may be associated with each worker criterion 6 according to the product of the particular associated worker criteria weight 56 and the worker sector weight 57. As FIG. 1 demonstrates: the sum of the absolute weights 58 within each information sector 5 equals the associated information sector weight 55; the sum of the absolute weights 59 within each worker sector 7 equals the associated worker sector weight 57; and the sum of all absolute weights 58 and 59 equals 100% or 1.0. The present invention contemplates assigning and manipulating weights 54, 55, 56, and 57 in any suitable manner.

In one embodiment, weights 54, 55, 56, and 57 are generated by surveying one or more selected managers, executives or other individuals responsible in some manner for the performance of the surveyed workers. As previously discussed, each weight 54, 55, 56, and 57 numerically represents an assessment concerning the importance of a particular information criterion 4, information sector 5, worker criterion 6, or worker sector 7, respectively, according to the qualitative content of the assessment. The present invention contemplates other suitable methods for assigning weights to information and worker criteria 4 and 6, respectively, and information and worker sectors 5 and 7, respectively, according to framework 2.

Collectively, information criteria ranks 50, worker criteria ranks 52, information criteria weights 54, worker criteria weights 56, information sector weights 55, and worker sector weights 57 comprise the survey data. The survey data also includes information concerning the surveyed workers, worker associates, worker community, organization, and any other characteristic suitable to create a worker profile for each surveyed worker. The survey data may be generated in any suitable manner, for example, using bubble charts that are filled in by hand and later read by a computer or other device. As discussed more fully below in connection with FIG. 2, the survey data is used to generate one or more knowledge worker productivity assessments concerning the surveyed workers or groups of workers.

FIG. 2 illustrates a system for generating a knowledge worker productivity assessment 10 that includes a database 12. Database 12 is generally any collection of data that may be accessed in order to retrieve, modify, delete, store, or communicate information in some manner. Database 12 includes a rank database 14 and a weight database 16 that are populated with survey data 15 after survey data 15 has been suitably generated according to framework 2. In one embodiment, rank database 14 is populated with information criteria ranks 50 and worker criteria ranks 52, and weight database 16 is populated with information criteria weights 54, information sector weights 55, worker criteria weights 56, and worker sector weights 57. The present invention contemplates populating database 12 with survey data 15 in any suitable manner.

Database 12 also includes a benchmark database 18. Benchmark database 18 contains one or more benchmark values associated with workers or groups of workers represented by survey data 15 or with survey data generated as a result of past surveys using workers and others within the same or other organizations or worker communities. Benchmark database 18 may include benchmark values suitable for comparison with selected survey data 15 or one or more selected manipulations of survey data 15. For example, benchmark database 18 may contain benchmark values for information and worker sector rank totals 51 and 53, respectively. As discussed more fully below, benchmark database 18 may contain benchmark values representing any suitable mathematical or other manipulation of survey data 15 or information generated as a result of past surveys.

System 10 compares selected survey data 15 and manipulations of survey data 15 with appropriate benchmark values to generate one or more knowledge worker productivity assessments concerning the workers or groups of workers associated with survey data 15. The present invention contemplates as many benchmark values, generated in any suitable manner and in any suitable form, as are necessary or desirable to generate one or more knowledge worker productivity assessments using system 10.

Retriever 20 is coupled to and accesses database 12. In general, retriever 20 retrieves information and worker criteria ranks 50 and 52, respectively, from rank database 14 and places information and worker criteria ranks 50 and 52, respectively, in a format suitable for manipulation by system 10. Retriever 20 may similarly retrieve and format information and worker criteria weights 54 and 56, respectively, and information and worker sector weights 55 and 57, respectively, from weight database 16 and benchmark values from benchmark database 18. The present invention contemplates retrieving information, including survey data 15 and benchmark values, from database 12 in any manner suitable to allow system 10 to generate one or more knowledge worker productivity assessments using some or all of the information.

Retriever 20 is coupled to validator 22. Validator 22 examines survey data 15 to determine whether survey data 15 suitable for generating one or more knowledge worker productivity assessments. Validator 22 examines survey data 15 in accordance with one or more validation parameters 24. For example, validator 22 may confirm that information and worker criteria weights 54 and 56, respectively, total 100% or 1.0 for each information and worker sector 5 and 7, respectively, and that the sum of all of the information and worker sector weights 55 and 57, respectively, totals 100% or 1.0. If survey data 15 is not sufficiently complete or there is some other reason to question the validity of survey data 15, as specified by validation parameters 24, then validator 22 may respond in some suitable manner. In one embodiment, validator 22 responds by invoking modifier 30, as discussed more fully below.

Validator 22 is coupled to segmentor 26. Segmentor 26 examines survey data 15, including information and worker criteria ranks 50 and 52, respectively, and determines whether to segment survey data 15 into multiple survey data segments 32, 34, and 36. Segmentor 26 examines survey data 15 according to one or more segmentation parameters 28. For example, segmentor 26 may segment survey data 15 according to profiles associated with some or all of the surveyed workers, worker associates, worker communities, organizations, or other identifiable groups with which system 10 may be concerned, segmentation parameters 28 specifying the manner in which the profiles are segregated to form survey data segments 32, 34, and 36.

Greater uniformity within each survey data segment 32, 34, or 36 may allow system 10 to generate more meaningful knowledge worker productivity assessments for the workers represented by survey data segments 32, 34, and 36. Therefore, segmentation parameters 28 may also specify a numerical range within which the survey data 15 for each survey data segment 32, 34, and 36 must lie, based on a mean and a standard deviation associated with each survey data segment 32, 34, and 36. For example, if information criteria ranks 50 are not sufficiently uniform for the surveyed workers or group of workers, as specified by segmentation parameters 28, then segmentor 26 may segment survey data 15 into survey data segments 32, 34, and 36 for which ranks 50 are more internally uniform.

Although only survey data segments 32, 34, and 36 are discussed, the present invention contemplates segmenting survey data 15, including ranks 50 and 52, into as many survey data segments as are necessary or desirable. System 10 may generate distinct knowledge worker productivity assessments for each survey data segment 32, 34, and 36. Segmentor 26 may further respond by invoking modifier 30 instead of or in addition to segmenting survey data 15.

Validator 22 and segmentor 26 are coupled to modifier 30 and may invoke modifier 30 in response to examining survey data 15 in accordance with validation parameters 24 or segmentation parameters 28, respectively. Modifier 30 may modify survey data 15, including information criteria ranks 50 and worker criteria ranks 52, or may modify the processing activity of system 10 in any suitable manner. For example, modifier 30 may prevent system 10 from further processing one or more incomplete, questionable, or otherwise unsuitable ranks 50 or 52 and may delete such ranks 50 or 52 from rank database 14. Modifier 30 may cause system 10 to terminate processing entirely, pending appropriate modification of one or more incomplete, questionable, or otherwise unsuitable ranks 50 or 52. Furthermore, modifier 30 may cause new survey data 15 to be generated to replace or combine with some or all of the original survey data 15, possibly using one or more modified survey techniques. The present invention contemplates modifying survey data 15 or the processing activity of system 10 in any suitable manner.

Calculator 38 receives and manipulates survey data segments 32, 34, and 36 in order to generate one or more comparison values 39 for each survey data segment 32, 34, and 36. As discussed below, system 10 compares comparison values 39 with the benchmark values contained in benchmark database 18 to generate knowledge worker productivity assessments for survey data segments 32, 34, and 36. Calculator 38 is coupled to and may access survey data 15 contained in weight database 16, including information and worker criteria weights 54 and 56, respectively, and information and worker sector weights 55 and 57, respectively, in order to generate comparison values 39. Calculator 38 may access weight database 16 directly or system 10 may retrieve and format information from weight database 16 using retriever 20 instead of or in addition to calculator 38.

As discussed above, each survey data segment 32, 34, and 36 may include survey data 15 generated as a result of multiple surveys. Calculator 38 may manipulate survey data 15 contained in survey data segments 32, 34, and 36 and weight database 16 to generate the following comparison values 39 for each information criterion 4 and worker criterion 6, without limitation: the high, low, mean, median, and standard deviation for information and worker criteria ranks 50 and 52, respectively; the high, low, mean, median, and standard deviation for information and worker criteria weights 54 and 56, respectively; the high, low, mean, median, and standard deviation for weighted values equal to the product of the information and worker criteria ranks 50 and 52, respectively, and their associated information and worker criteria weights 54 and 56, respectively, or information and worker sector weights 55 and 57, respectively; the high, low, mean, median, and standard deviation for absolute weights 58 and 59, respectively; the high, low, mean, median, and standard deviation for an absolute weighted value equal to the product of the information and worker criteria ranks 50 and 52, respectively, and their associated absolute weights 58 and 59, respectively; and any other value suitable for comparison with one or more benchmark values contained in benchmark database 18.

Calculator 38 may also generate the following comparison values 39 for each information sector 5 and worker sector 7, without limitation: the high, low, mean, median, and standard deviation for information and worker sector rank totals 51 and 53, respectively; the high, low, mean, median, and standard deviation for information and worker sector weights 55 and 57, respectively; and any other value suitable for comparison with one or more benchmark values contained in benchmark database 18.

Calculator 38 may further generate the following comparison values 39, without limitation: the high, low, mean, median, and standard deviation for a value of available information equal to the sum of information sector rank totals 51; the high, low, mean, median, and standard deviation for a value added by the worker to the available information equal to the sum of worker sector rank totals 53; the high, low, mean, median, and standard deviation for a knowledge worker productivity level equal to the sum all information sector rank totals 51 and worker sector rank totals 53; and any other value suitable for comparison with one or more benchmark values contained in benchmark database 18. Calculator 38 may generate comparison values 39 for each survey data segment 32, 34, and 36 in a serial fashion or more or less simultaneously. The present invention contemplates any suitable method of generating one or more comparison values 39 using survey data 15.

Relator 40 receives comparison values 39 generated by calculator 38 and compares comparison values 39 to one or more benchmark values contained in and selected from benchmark database 18. Benchmark database 18 may contain one or more benchmark values for each comparison value 39. As discussed above, the benchmark values may be associated with workers or groups of workers represented by survey data 15 or with survey data generated as a result of past surveys using workers and others within the same or other organizations or worker communities. Therefore, system 10 may generate relative knowledge worker productivity assessments for selected workers or groups of workers associated with survey data 15 by comparing comparison values 39 with one or more appropriate benchmark values.

For example, a particular comparison value 39 might be the absolute weight associated with the "applicability" information criterion 4 and equaling "0.06," and a suitable benchmark value for comparison value 39 might be "0.16." The disparity between comparison value 39 and the benchmark value of "ten percent" or "0.10" might indicate that one or more variables associated with the surveyed worker or workers requires attention in some manner. Although in this example, the disparity is expressed as a mathematical difference, the present invention contemplates determining and expressing any disparity with respect to a standard deviation, as a percentage of other survey data 15, with respect to relative percentiles or quartiles, or in any other suitable manner. Knowledge worker productivity assessments generated using relator 40 may communicate such concerns to appropriate individuals associated with the surveyed worker or workers in order to improve the productivity of the surveyed worker or workers. As discussed below, relator may also invoke modifier 42 instead of or in addition to generating a knowledge worker productivity assessment.

The present invention contemplates comparing as many comparison values 39 with benchmark values as is necessary or desirable. Relator 40 may access benchmark database 18 directly or system 10 may retrieve and format information from benchmark database 18 using retriever 20 instead of or in addition to relator 40. Relator 40 may generate one or more productivity assessments for each survey data segment 32, 34, and 36 in a serial fashion or more or less simultaneously. The present invention contemplates any suitable method for comparing a comparison value 39 with a benchmark value in order to generate a knowledge worker productivity assessment. The present invention contemplates using benchmark database 18 to store one or more comparison values 39 for use as benchmark values in generating subsequent knowledge worker productivity assessments.

Relator 40 is coupled to modifier 42 and may invoke modifier 42 in response to comparing one or more comparison values 39 with one or more benchmark values. Modifier 42 may modify survey data 15, including information and worker criteria weights 54 and 56, respectively, and information and worker sector weights 55 and 57, respectively, or may modify the processing activity of system 10 in any suitable manner. Furthermore, modifier 42 may cause new survey data 15 to be generated to replace or combine with some or all of the original survey data 15, possibly using one or more modified survey techniques.

Reporter 44 receives knowledge worker productivity assessments generated using relator 40 and, in response, generates analysis reports. The analysis reports may be generated in any manner and in any form suitable for analysis by, for example, managers, supervisors, consultants, analysts, or computers or other devices.

System 10 may operate on one or more computers 60. Computer 60 may include an input device 62, such as a keypad, touch screen, or other device that can accept information. An output device 64 may convey information associated with the operation of system 10, including digital or analog data, visual information, or audio information. Both input device 62 and output device 64 may include fixed or removable storage media, such as magnetic computer disks, CD-ROM, or other suitable media to both receive output from and provide input to system 10. Computer 60 may have a processor 66 and an associated volatile or non-volatile memory to execute instructions and manipulate information in accordance with the operation of system 10.

In operation, retriever 20 retrieves survey data 15 from rank database 14, including information and worker criteria ranks 50 and 52, respectively, and formats survey data 15 for manipulation by system 10. Validator 22 examines survey data 15 in accordance with validation parameters 24, and segmentor 26 segments survey data 15, if necessary or desirable, into survey data segments 32, 34, and 36 in accordance with segmentation parameters 28. Modifier 30 may modify survey data 15 or the processing activity of system 10 according to the activities of validator 22 or segmentor 26 and validation parameters 24 and segmentation parameters 28, respectively.

Calculator 38 receives and manipulates survey data segments 32, 34, and 36 in order to generate one or more comparison values 39 for each survey data segment 32, 34, and 36. Calculator 38 may access survey data 15 contained in weight database 16, including information and worker criteria weights 54 and 56, respectively, and information and worker sector weights 55 and 57, respectively, in generating comparison values 39.

Relator 40 receives comparison values 39 for survey data segments 32, 34, and 36 from calculator 38 and compares comparison values 39 to selected benchmark values contained in benchmark database 18. In response to these comparisons, relator 40 generates one or more knowledge worker productivity assessments for the workers or groups of workers represented by survey data segments 32, 34, and 36. Relator 40 may use benchmark database 18 to store one or more comparison values 39 for use as benchmark values in generating subsequent knowledge worker productivity assessments. Relator 40 may also invoke modifier 42 in response to the comparisons.

Reporter 44 receives knowledge worker productivity assessments generated using relator 40 and, in response, generates analysis reports. The present invention contemplates any suitable method for assessing worker productivity using database 12, retriever 20, validator 22, segmentor 26, modifier 30, calculator 38, relator 40, modifier 42, and reporter 44.

Figure 3:
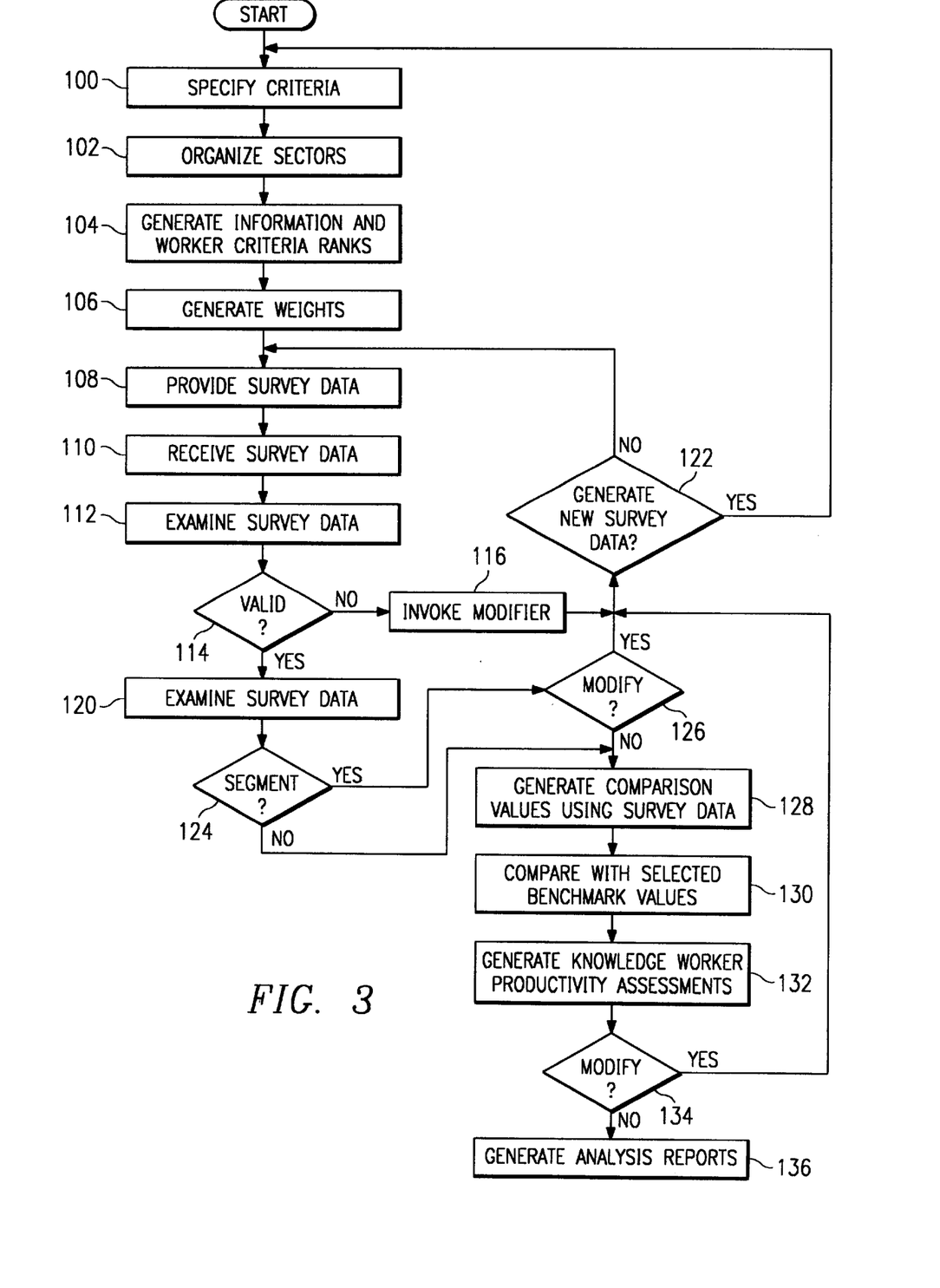
FIG. 3 is a flow chart of a method for assessing knowledge worker productivity.

FIG. 3 is a flow chart of a method for assessing knowledge worker productivity using system 10. The method begins at step 100, where information criteria 4 and worker criteria 6 are specified. As discussed more fully above, each information criterion 4 is selected from a number of characteristics associated with the information environment surrounding a worker or group of workers, and each worker criterion 6 is selected from a number of characteristics associated with the capabilities of the worker or group of workers.

At step 102, information and worker criteria 4 and 6, respectively, are organized into information and worker sectors 5 and 7, respectively, according to the relationships between the various information and worker criteria 4 and 6, respectively. Information and worker sectors 5 and 7 may be specified and organized in any suitable manner. Once specified and suitably defined, information criteria 4, worker criteria 6, information sectors 5, and worker sectors 7 may be qualitatively assessed by workers and others in order to generate survey data 15.

At step 104, information criteria 4 and worker criteria 6 are qualitatively assessed in order to generate information criteria ranks 50 and worker criteria ranks 52, respectively. As discussed more fully above in connection with FIG. 1, framework 2 assigns a numerical value to each information and worker criterion 4 or 6, respectively, each time the particular criterion 4 or 6 is qualitatively assessed. The resulting information criteria ranks 50 and 52, respectively, numerically represent the qualitative content of the assessments. In one embodiment, each information criteria rank 50 and worker criteria rank 52 numerically represents a qualitative assessment concerning the perceived importance of a particular associated information or worker criterion 4 or 6, respectively, to the individual performing the assessment.

One or more surveys may be conducted at step 104 to generate information and worker criteria ranks 50 and 52, respectively. In one embodiment, each worker within a selected worker community or other group of workers is surveyed, separately or together, depending on the scope of the knowledge worker productivity assessment to be generated. Each surveyed worker qualitatively assesses information criteria 4 and, according to framework 2, generates information criteria ranks 50 for each information criterion 4 according the qualitative content of the assessments.

Similarly, worker associates such as peers, managers, and supervisors of the surveyed workers are selected and surveyed, separately or together, depending on the surveyed workers and the scope of the knowledge worker productivity assessment to be generated. Each worker associate qualitatively assesses worker criteria 6 and, according to framework 2, generates worker criteria ranks 52 for each worker criteria 6 according to the qualitative content of the assessments. The present invention contemplates generating information and worker criteria ranks 50 and 52, respectively, in any suitable manner at step 104.

At step 106, information criteria weights 54, worker criteria weights 56, information sector weights 55, and worker sector weights 57 are generated according to framework 2. In general, each weight 54, 55, 56, and 57 numerically represents a qualitative assessment concerning the relative importance of the particular associated information criterion 4, worker criterion 6, information sector 5, and worker sector 7, respectively, according to the qualitative content of the assessment.

As discussed more fully above in connection with FIG. 1, each weight 54, 55, 56, and 57 may be specified as a percentage or decimal value, such that: the sum of the information criteria weights 54 within each information sector 5 totals 100% or 1.0; the sum of the worker criteria weights 56 within each worker sector 7 totals 100% or 1.0; and the sum of all of the information and worker sector weights 55 and 57, respectively, totals 100% or 1.0. In one embodiment, weights 54, 55, 56, and 57 are generated at step 106 by surveying one or more selected managers, supervisors, executives, or other individuals responsible for the performance of the surveyed workers. The present invention contemplates generating weights 55, 55, 56, and 57 in any suitable manner.

At step 108, survey data 15 is provided to knowledge worker productivity assessment system 10. Survey data 15 may include, without limitation, information and worker criteria ranks 50 and 52, respectively, information and worker criteria weights 54 and 56, respectively, and information and worker sector weights 55 and 57, respectively. As discussed more fully above in connection with FIG. 2, survey data 15 may be provided using database 12, rank database 14, and weight database 16, in any suitable combination. Survey data 15 may be provided in any suitable manner.

At step 110, retriever 20 retrieves survey data 15 from database 12 and, if necessary, places survey data 15 in a format suitable for manipulation by system 10. Retriever 20 may retrieve all of the survey data 15 at step 110 or only some of the survey data 15, for example, information and worker criteria ranks 50 and 52, respectively. The present invention contemplates retrieving survey data 15 in any manner suitable to allow system 10 to generate one or more knowledge worker productivity assessments using some or all of the survey data 15.

At step 112, validator 22 examines survey data 15 in accordance with one or more validation parameters 24. For example, validator 22 may confirm that information and worker criteria weights 54 and 56, respectively, total 100% or 1.0 for each information and worker sector 5 and 7, respectively, and that the sum of all of the information and worker sector weights 55 and 57, respectively, totals 100% or 1.0. At step 114, if survey data 15 is deemed valid, as specified by validation parameters 24, then the method proceeds directly to step 120, where segmentor 26 examines survey data 15 in accordance with segmentation parameters 28. If survey data 15 is not sufficiently complete or there is some other reason to question the validity of survey data 15, as specified by validation parameters 24, then validator 22 may respond at step 116 by invoking modifier 30 or otherwise alerting system 10 to the condition. For example, as discussed above in connection with FIG. 2, modifier 30 may modify survey data 15, such as by deleting the incomplete or otherwise unsuitable ranks 50 and 52, or may modify the processing activity of system 10 in some suitable manner.

Modifier 30 may allow system 10 to continue further processing with respect to the validated survey data 15 or may cause system 10 to terminate processing entirely, pending modification of survey data 15. Whether or not system 10 continues further processing with respect to the validated survey data 15, modifier 30 may cause new survey data 15 to be generated at step 122 to replace or combine with the original survey data 15. If new survey data 15 is to be generated, the method returns to step 100 where new survey data is generated to replace or combine with the original survey data 15, possibly using one or more modified survey techniques. Otherwise, the method returns to step 108, where the modified survey data 15 is provided to system 10.

At step 120, segmentor 26 examines survey data 15 in accordance with one or more segmentation parameters 28. Based on this examination, segmentor 26 may segment survey data 15, including information and worker criteria ranks 50 and 52, respectively, into one or more survey data segments 32, 34, and 36 at step 124. For example, if information and worker criteria ranks 50 and 52, respectively, are not sufficiently uniform for the surveyed workers or group of workers, as specified by segmentation parameters 28, segmentor 26 may segment ranks 50 and 52 into survey data segments 32, 34, and 36 that are more internally uniform. Segmentor 26 may also segment survey data 15 according to profiles associated with some or all of the surveyed workers, worker associates, worker communities, organizations, or other identifiable groups with which system 10 may be concerned, segmentation parameters 28 specifying the manner in which the profiles are segregated to form survey data segments 32, 34, and 36.

If survey data 15 is not segmented at step 124, the method proceeds directly to step 128, where calculator 38 generates comparison values 39 using survey data 15. If survey data 15 is segmented at step 124, segmentor 26 may further respond by invoking modifier 30, in which case the method proceeds as discussed above in connection with validator 22. If no modifications to survey data 15 or the processing activity of system 10 are necessary or desirable at step 126, calculator 38 calculates comparison values 39 using survey data segments 32, 34, and 36 at step 128. The present invention contemplates generating comparison values 39 at step 128 whether or not modifier 30 is invoked.

Calculator 38 may access survey data 15 contained in weight database 16, directly or using retriever 20, including information and worker criteria weights 54 and 56, respectively, and information and worker sector weights 55 and 57, respectively, in order to generate comparison values 39. As discussed more fully above in connection with FIG. 2, any suitable comparison values 39 may be generated using survey data 15, including absolute weighted values for each information and worker criterion 4 and 6, respectively, and information and worker sector rank totals 51 and 53 for each information and worker sector 5 and 7, respectively. Comparison values 39 may be generated in any form and in any manner suitable to allow system 10 to generate one or more knowledge worker productivity assessments using comparison values 39.

At step 130, relator 40 receives comparison values 39 for survey data segments 32, 34, and 36 and compares comparison values 39 to one or more benchmark values contained in and selected from benchmark database 18. As discussed more fully above in connection with FIG. 2, benchmark database 18 may contain one or more benchmark values for each comparison value 39. In one embodiment, each benchmark value represents survey data generated as a result of past surveys using workers and others within the same or other organizations or worker communities. The present invention also contemplates using benchmark values that associated with workers or groups of workers represented by survey data 15 and manipulations of survey data 15. For example, information and worker sector rank totals 51 and 53, respectively, for one group of workers represented by survey data 15 may be used as benchmark values for comparison with comparison values 39 generated for other workers or groups of workers represented by survey data 15.

In response to comparing selected comparison values 39 with appropriate benchmark values at step 130, system 10 generates knowledge worker productivity assessments for the workers associated with each survey data segment 32, 34, and 36 at step 132. The present invention contemplates as many benchmark values as are necessary or desired, generated in any form and in any suitable manner, in order to generate one or more knowledge worker productivity assessments using the benchmark values.

At step 134, relator 40 may invoke modifier 42 in order to modify survey data 15 contained in criteria weight file 16, including information and worker criteria weight factors 54 and 56, respectively, and information and worker sector weight factors 55 and 57, respectively, according to the comparisons performed by comparing module 40. Modifier 42 may also modify the processing activity of system 10 in some suitable manner. Furthermore, it may be desirable to modify the benchmark values contained in benchmark database 18 to include the comparison values 39 generated using calculator 38. Modifier 42 may be invoked, if at all, before, during, or after relator 40 generates some or all of the knowledge worker productivity assessments. If modifier 42 is invoked at step 134, the method proceeds as discussed above in connection with validator 22, where validator 22 invokes modifier 30 at step 116. If no modifications to survey data 15 or the processing activity of system 10 are necessary or desirable at step 134, analysis reports are generated at step 136 using reporting capability 44. The present invention contemplates generating analysis reports whether or not modifier 42 is invoked.

Although the present invention has been described with several embodiments, a plethora of changes, substitutions, variations, alterations, transformations and modifications may be suggested to one skilled in the art, and it is intended that the present invention encompass such changes, substitutions, variations, alterations, transformations and modifications as fall within the spirit and scope of the appended claims.

What is claimed is:

1. A system operable on one or more computers for generating a knowledge worker productivity assessment, comprising:

a database operable to store survey data and at least one benchmark value, the survey data representing a qualitative assessment concerning a predetermined criterion associated with a knowledge worker;

a retriever coupled to the database and operable to retrieve selected survey data and a selected benchmark value from the database, the retriever operable to communicate the selected survey data and benchmark value;

a segmentor coupled to the retriever and operable to segment the retrieved survey data into a plurality of survey data segments according to one or more segmentation parameters;

a calculator coupled to the retriever and operable to receive the survey data and to generate a comparison value for at least one survey data segment;

a relator coupled to the calculator and operable to receive the benchmark value and to generate a knowledge worker productivity assessment by comparing a comparison value for a survey data segment to the selected benchmark value.

2. The system of claim 1, further comprising a validator operable to examine the selected survey data according to a sum of survey responses.

3. The system of claim 1, wherein the segmentor is operable to segment the selected survey data into a plurality of survey data segments according to a knowledge worker profile.

4. The system of claim 1, wherein the qualitative assessment concerns the perceived importance of the criterion to the individual performing the assessment.

5. The system of claim 1, wherein the survey data comprises a plurality of criteria ranks, each criteria rank associated with a particular criterion.

6. The system of claim 1, wherein the survey data includes a plurality of criteria weights, each criteria weight associated with a particular criterion.

7. The system of claim 1, wherein the survey data is arranged in one or more sectors, each sector including one or more criteria and having an associated sector weight.

8. The system of claim 1, wherein the comparison value is a sector rank total equal to the sum of one or more criteria ranks associated with a sector.

9. The system of claim 1, wherein the comparison value is an absolute weighted value equal to the product of a criteria rank, a criteria weight, and a sector weight.

10. A method operable on one or more computers for generating a knowledge worker productivity assessment, comprising:

provinding survey data numerically representing a qualitative assessment concerning a predetermined criterion associated with a knowledge worker;

storing the survey data and at least one benchmark value in a database;

retrieving selected survey data and a selected benchmark value from the database;

generating a comparison value using the selected survey data, the comparison value being weighted according to at least a criteria weight;

comparing the comparison value to the selected benchmark value; and generating a knowledge worker productivity assessment according to the comparison.

11. The system of claim 10, wherein the qualitative assessment concerns the perceived importance of the criterion to the individual performing the assessment.

12. The method of claim 10, wherein the survey data comprises:

a plurality of criteria ranks, each criteria rank associated with a particular criterion;

a plurality of criteria weights, each criteria weight associated with a particular criterion; and a plurality of sector weights, each sector weight associated with a particular criterion.

13. The system of claim 10, wherein the comparison value is a sector rank total equal to the sum of one or more criteria ranks associated with a sector.

14. The system of claim 10, wherein the comparison value is an absolute weighted value equal to the product of a criteria rank, a criteria weight, and a sector weight.

15. The system of claim 10, wherein the benchmark value represents survey data associated with a past survey concerning a knowledge worker.

16. A method operable on one or more computers for generating a knowledge worker productivity assessment, comprising:

providing survey data numerically representing a qualitative assessment concerning a predetermined criterion associated with a knowledge worker;

storing the survey data and at least one benchmark value in a database;

retrieving selected survey data and a selected benchmark value from the database;

segmenting the survey data into a plurality of survey data segments according to one or more segmentation parameters;

generating a comparison value for each survey data segment using a calculator;

comparing, for each survey data segment, the comparison values to the selected benchmark value; and generating a knowledge worker productivity assessment according to the comparison.

17. The method of claim 16, wherein the survey data is generated according to a framework that assigns numerical representations to qualitative assessments concerning criteria associated with a knowledge worker according to the qualitative content of the assessments.

18. The method of claim 16, wherein the survey data comprises:

a plurality of criteria ranks, each criteria rank associated with a particular criterion;

a plurality of criteria weights, each criteria weight associated with a particular criterion; and a plurality of sector weights, each sector weight associated with a particular criterion.

19. The method of claim 16, wherein the comparison value is an absolute weighted value equal to the product of a criteria rank, a criteria weight, and a sector weight.

20. The method of claim 16, wherein the segmentation parameters specify segmenting the survey data according to a knowledge worker profile associated with surveyed workers.

* * * * *